(12) United States Patent  (10) Patent No.: US 7,993,103 B2
Cairo                     (45) Date of Patent:    Aug. 9, 2011

(54) WIND TURBINE BLADES AND METHODS OF ATTACHING SUCH BLADES TO A HUB

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 11/326,228

(22) Filed: Jan. 5, 2006

(65) Prior Publication Data

US 2007/0154317 A1   Jul. 5, 2007

(51) Int. Cl.
*F03D 1/06*  (2006.01)
*F03D 11/00* (2006.01)

(52) U.S. Cl. ............... 416/210 R; 416/211; 416/214 R; 416/220 A; 416/222; 416/226; 416/230; 29/889; 29/889.3; 29/889.6; 29/889.71; 29/889.72; 403/293; 403/294; 403/337

(58) Field of Classification Search .............. 416/204 R, 416/204 A, 207–209, 226, 241 A, 210 R, 416/210 A, 211, 214 R, 214 A, 230, 220 A, 222; 29/889, 889.21, 889.3, 889.6, 889.7, 889.71, 889.72; 403/292, 294, 335–337

See application file for complete search history.

(56) References Cited

U.S. PATENT DOCUMENTS

| | | | | |
|---|---|---|---|---|
| 1,878,816 | A | * | 9/1932 | Bucklen .................. 416/214 A |
| 2,985,245 | A | * | 5/1961 | Maloof .................... 416/210 R |
| 4,236,873 | A | * | 12/1980 | Sherman et al. ......... 416/204 R |
| 4,915,590 | A | | 4/1990 | Eckland et al. |
| 5,219,454 | A | * | 6/1993 | Class ....................... 416/204 R |
| 5,308,228 | A | * | 5/1994 | Benoit et al. ................. 416/230 |
| 5,458,465 | A | * | 10/1995 | von Wieser et al. ...... 416/214 R |
| 6,068,446 | A | | 5/2000 | Tangler et al. |

* cited by examiner

*Primary Examiner* — Christopher Verdier
(74) *Attorney, Agent, or Firm* — Armstrong Teasdale LLP

(57) ABSTRACT

A wind turbine blade assembly is provided. The assembly includes at least one wind turbine blade. The blade includes a blade root portion. The assembly also includes at least one blade root hub fitting coupled to the blade root portion. The blade root hub fitting is configured to couple to a rotatable hub.

8 Claims, 6 Drawing Sheets

WIND TURBINE BLADES AND METHODS OF ATTACHING SUCH BLADES TO A HUB

BACKGROUND OF THE INVENTION

This invention relates generally to rotary machines and more particularly, to methods and apparatus for attaching wind turbine blades to a hub.

Generally, a wind turbine includes a rotor having multiple blades. The rotor is mounted on a housing, or nacelle, that is positioned on top of a truss or tubular tower. Utility grade wind turbines (i.e., wind turbines designed to provide electrical power to a utility grid) can have large rotors, e.g., 30 meters (m) (98 feet (ft)) or more in diameter. Blades, attached to rotatable hubs on these rotors, transform mechanical wind energy into a mechanical rotational torque that drives one or more generators. The generators are generally, but not always, rotationally coupled to the rotor through a gearbox. The gearbox steps up the inherently low rotational speed of the turbine rotor for the generator to efficiently convert the rotational mechanical energy to electrical energy, which is fed into a utility grid. Gearless direct drive turbines also exist.

Contemporary blades are typically at least partially fabricated of a laminated (i.e., layered) fiber/resin composite material. In general, reinforcing fibers are deposited into a resin within a range of predetermined orientations. The fiber orientations are often determined by a range of expected stress factors that a blade may experience during an expected blade lifetime. The planar regions between the laminations are often referred to as interlaminar regions and are normally the weakest element of a composite material. Loads are normally carried in the planes of the laminations and such loads are transferred from the planes of the lamina to an attachment or interface with another component, i.e., the hub. This transfer typically occurs via interlaminar shear, tension, compression, or a combination thereof. As a consequence, when load within the laminar planes is increased, stress on the interlaminar regions increases as well. In the event that an interlaminar shear stress limit (i.e., the shearing force tending to produce displacement between two lamina along the plane of their interface) of an interlamination region is exceeded, the potential for delamination (the separation of a laminated material along the plane of the interlaminar regions) is increased. Delamination may lead to material strain, i.e., elastic deformation of a material as a result of stress.

Some examples of stress factors are vertical wind shear, localized turbulence (including interaction of the rotor with the tower), gravity, wind flow variations and start-stop cycles. Vertical wind shear is typically defined as the relationship between wind speeds and height above the surface of the earth, i.e., altitude. In general, as the altitude increases, wind speed increases. Given a blade of 30 meters (98 ft) or more, and the subsequent large diameter of rotation (at least twice the blade length plus the diameter of the associated hub), wind speed can increase 5% to 10% above that at the hub centerline from the hub centerline up to the end of the blade at the blade tip with the blade pointing straight upward. The wind speed may also decrease 5% to 10% below that at the hub centerline from the hub centerline down to the end of the blade at the blade tip with the blade pointing straight downward. As the blades rotate, the cyclic increasing and decreasing of the wind shear induces a cyclic in-plane or interlaminar stress within the blades.

Localized turbulence includes stationary wakes and bow waves induced by the blades and by the near proximity of the rotating blades to the tower. As the blades rotate through these localized regions, additional stresses are induced within the blades. Also, as the blades rotate, gravity induces fluctuating bending moments within the blades that also induce in-plane and interlaminar stresses. Cyclic acceleration and deceleration of the blades due to the aforementioned wind flow variations and start-stop cycles induce cyclic stresses on the blades as well.

The blades are typically designed and manufactured to withstand such stresses including the cumulative impact of such stresses in a variety of combinations. The blades are also designed and manufactured to withstand the cumulative impact of a predetermined number of stress cycles, commonly referred to as fatigue cycles. Upon exceeding the predetermined number of fatigue cycles, the potential for material delamination may increase.

As described above, blades are typically attached to a rotating hub at attachment regions designed and fabricated to receive the blades. The blades also have integral attachment regions. The hub and the blade attachment regions act as load transfer regions. For example, the weight of the blades and the aforementioned cyclic stresses are transferred to the hub attachment regions via the blade attachment regions. Also, as described above, the majority of the load is carried through the planes of the laminations except in the immediate vicinity of attachments and interfaces. As blade size and weight increase, the laminations of the blade attachment regions may have an increased potential for exceeding interlaminar shear stress limits.

BRIEF DESCRIPTION OF THE INVENTION

In one aspect, a method of assembling a wind turbine system is provided. The method includes coupling a wind turbine blade to a blade root hub fitting. The method also includes coupling the blade root hub fitting to a rotatable hub.

In another aspect, a wind turbine blade assembly is provided. The assembly includes at least one wind turbine blade. The blade includes a blade root portion. The assembly also includes at least one blade root hub fitting coupled to the blade root portion. The blade root hub fitting is configured to couple to a rotatable hub.

In a further aspect, a wind turbine system is provided. The system includes a rotatable hub and at least one wind turbine blade assembly. The assembly includes at least one wind turbine blade and at least one blade root hub fitting coupled to the blade. The blade includes a blade root portion. The blade root hub fitting is configured to couple to the rotatable hub.

DETAILED DESCRIPTION OF THE INVENTION

Figure 1:
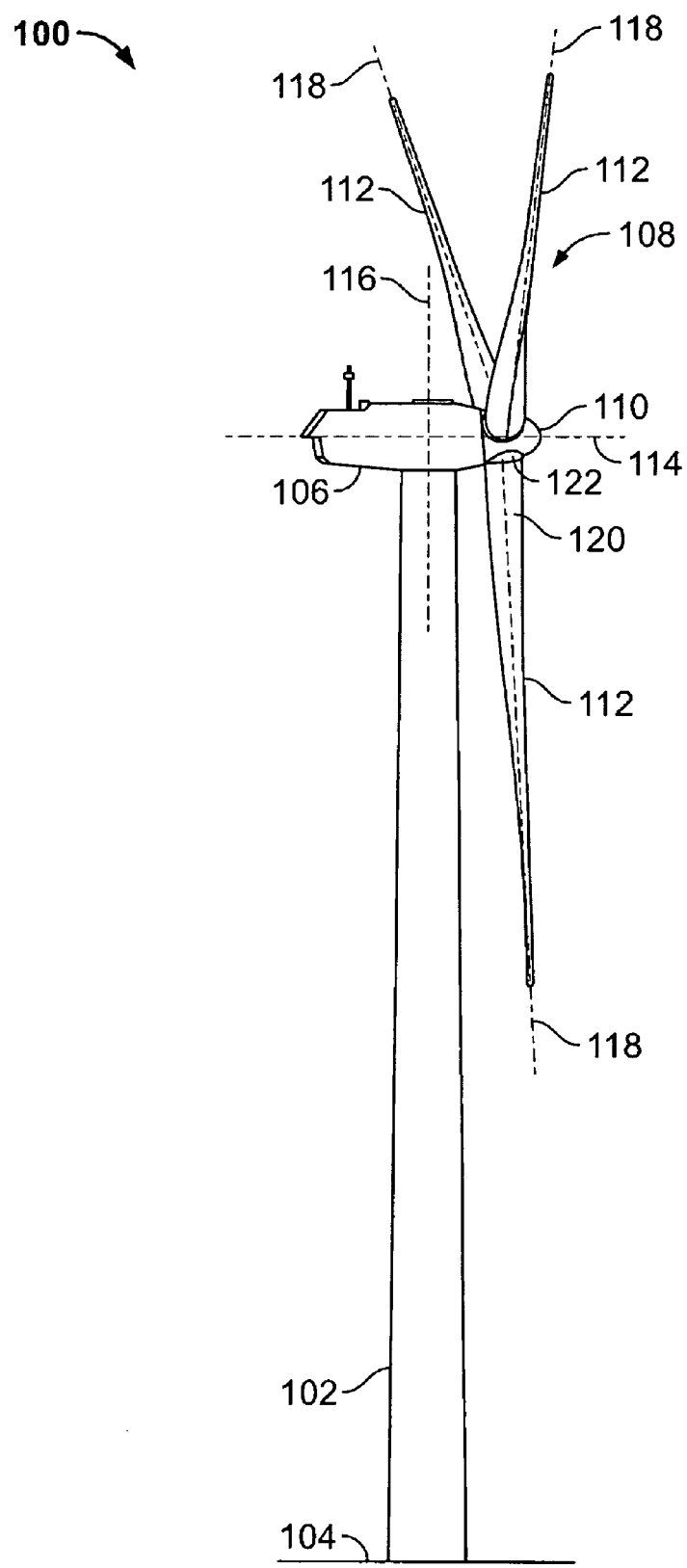
FIG. 1 is a schematic illustration of an exemplary wind turbine system.

FIG. 1 is a schematic illustration of an exemplary wind turbine system 100. In the exemplary embodiment, system 100 is a horizontal axis wind turbine. Alternatively, system 100 may be a vertical axis wind turbine. Wind turbine system 100 has a tower 102 extending from a supporting surface 104, a nacelle 106 mounted on tower 102, and a rotor 108 coupled to nacelle 106. Rotor 108 has a rotatable hub 110 and at least one wind turbine blade assembly that includes at least one wind turbine blade 112 and at least one blade root hub fitting (not shown in FIG. 1) coupled to blade 112. In one embodiment, rotor 108 has a plurality of rotor blades 112 coupled to hub 110. In the exemplary embodiment, rotor 108 has three rotor blades 112 that each include a blade root portion 120. In an alternative embodiment, rotor 108 may have more or less than three rotor blades 112. In the exemplary embodiment, tower 102 is fabricated from tubular steel and has a cavity (not shown in FIG. 1) extending between supporting surface 104 and nacelle 106. In an alternate embodiment, tower 102 is a lattice tower. The terms 'rotor blade' and 'wind turbine blade' are used interchangeably throughout the present disclosure.

Various components of wind turbine 100, in the exemplary embodiment, are housed in nacelle 106 atop tower 102 of wind turbine 100. For example, rotor 108 is coupled to an electric generator (not shown in FIG. 1) that is positioned within nacelle 106. Rotation of rotor 108 causes the generator to produce electrical power. Also positioned in nacelle 106 is a yaw adjustment mechanism (not shown in FIG. 1) that may be used to rotate nacelle 106 and rotor 108 on axis 116 to control the perspective of blades 112 with respect to the direction of the wind. The height of tower 102 is selected based upon factors and conditions known in the art.

Blades 112 are positioned about rotor hub 110 to facilitate rotating rotor 108 to transfer kinetic energy from the wind into usable mechanical energy, and subsequently, electrical energy. Blades 112 are mated to hub 110 by coupling blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122.

In the exemplary embodiment, blades 112 may have a length between 50 meters (m) (164 feet (ft)) to 100 m (328 ft). Alternatively, blades 112 may have any length. As the wind strikes blades 112, rotor 108 is rotated about rotation axis 114. As blades 112 are rotated and subjected to centrifugal forces, blades 112 are subjected to various bending moments and other operational stresses. As such, blades 112 may deflect and/or rotate from a neutral, or non-deflected, position to a deflected position and an associated stress may be induced in blades 112. Moreover, a pitch angle of blades 112, i.e., the angle that determines blades 112 perspective with respect to the direction of the wind, may be changed by a pitch adjustment mechanism (not shown in FIG. 1) to facilitate increasing or decreasing blade 112 speed by adjusting the surface area of blades 112 exposed to the wind force vectors. Pitch axis 118 for blades 112 are illustrated. In the exemplary embodiment, the pitches of blades 112 are controlled individually. Alternatively, blades 112 pitch may be controlled as a group.

In some configurations, one or more microcontrollers in a control system (not shown in FIG. 1) are used for overall system monitoring and control including pitch and rotor speed regulation, yaw drive and yaw brake application, and fault monitoring. Alternatively, distributed or centralized control architectures are used in alternate embodiments of wind turbine 100.

Figure 2:
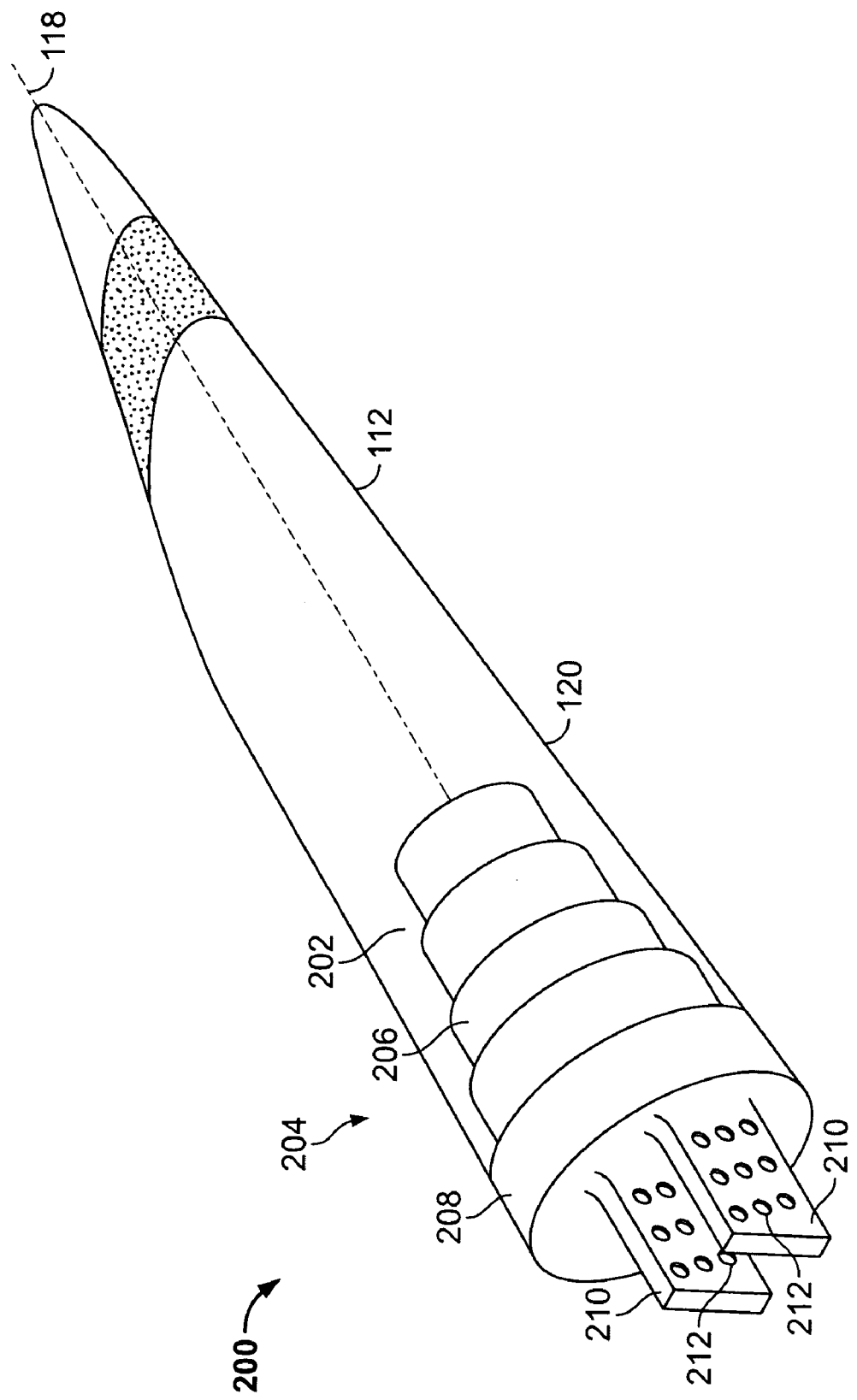
FIG. 2 is a schematic illustration of an exemplary wind turbine blade assembly that may be used with the wind turbine system in FIG. 1.

FIG. 2 is a schematic illustration of an exemplary wind turbine blade assembly 200 that may be used with wind turbine system 100 (shown in FIG. 1). Pitch axis 118 is illustrated to facilitate illustrating assembly 200 orientation with respect to system 100. Assembly 200 includes blade 112 and has a fitting cavity 202 formed within blade root end 120. Fitting cavity 202 is dimensioned to receive a stepped joint blade root hub fitting 204. More specifically, in the exemplary embodiment, fitting cavity 202 is defined by a stepped surface 240 of blade root end portion 120. Fitting 204 has a plurality of stepped portions 206 integrally mated to a clevis joint portion 208. Stepped portions 206 facilitate an efficiency and effectiveness of load transfer by mitigating a potential for "dead zones," i.e., areas wherein little to no load transfer is accomplished. The dead zone condition is most likely near the center of each stepped portion 206, due to the interfaces of fitting stepped portion 206 to fasteners 214 and since blade root portion 120 is nearer the circumference of each stepped portion of portion 206. By stepping up each portion 206, load transfer to a broader range of lamina is facilitated by more evenly distributing load transfer from blade root portion 120 and fasteners 214. Therefore, the load induced within portion 208 (which will generally be substantially the entire load associated with blade 112) is more evenly distributed across the lamina of portion 208, thereby mitigating the load transferred per unit lamination, and increasing the margin to an interlaminar stress limit.

Clevis plate portion 208 has two clevis plates 210, and plates 210 each have nine fastener open passages 212. In an alternative embodiment, clevis plate portion 208 includes only one clevis plate 210. Alternatively, any number of clevis plates 210 and any number of open passages 212 that facilitate efficient load transfer may be used. Portion 208 also has a blade 112 access portal (not shown in FIG. 2) positioned between clevis plates 210. Plates 210 are used to fasten fitting 204 to hub 110 as discussed further below.

In the exemplary embodiment, hub fitting 204 is fabricated from a casting of stainless steel. Alternatively, hub fitting 204 may be fabricated of any material or combination of materials that maintain a predetermined margin to operational parameters. Also alternatively, hub fitting 204 may be manufactured as smaller components mated together using methods familiar to those practiced in the art. For example, portion 208 may be independently cast and welded to portions 206. Also, in this alternative embodiment, hub fitting 204 has four stepped portions. The efficiency and effectiveness of load transfer is partially determined by the number, the circumferential length, the axial (spanwise) length and diameter of stepped portions 206 and 208. Alternatively, any number, length and diameter of portions 206 and 208 may be used to facilitate efficient and effective load transfer.

Figure 3:
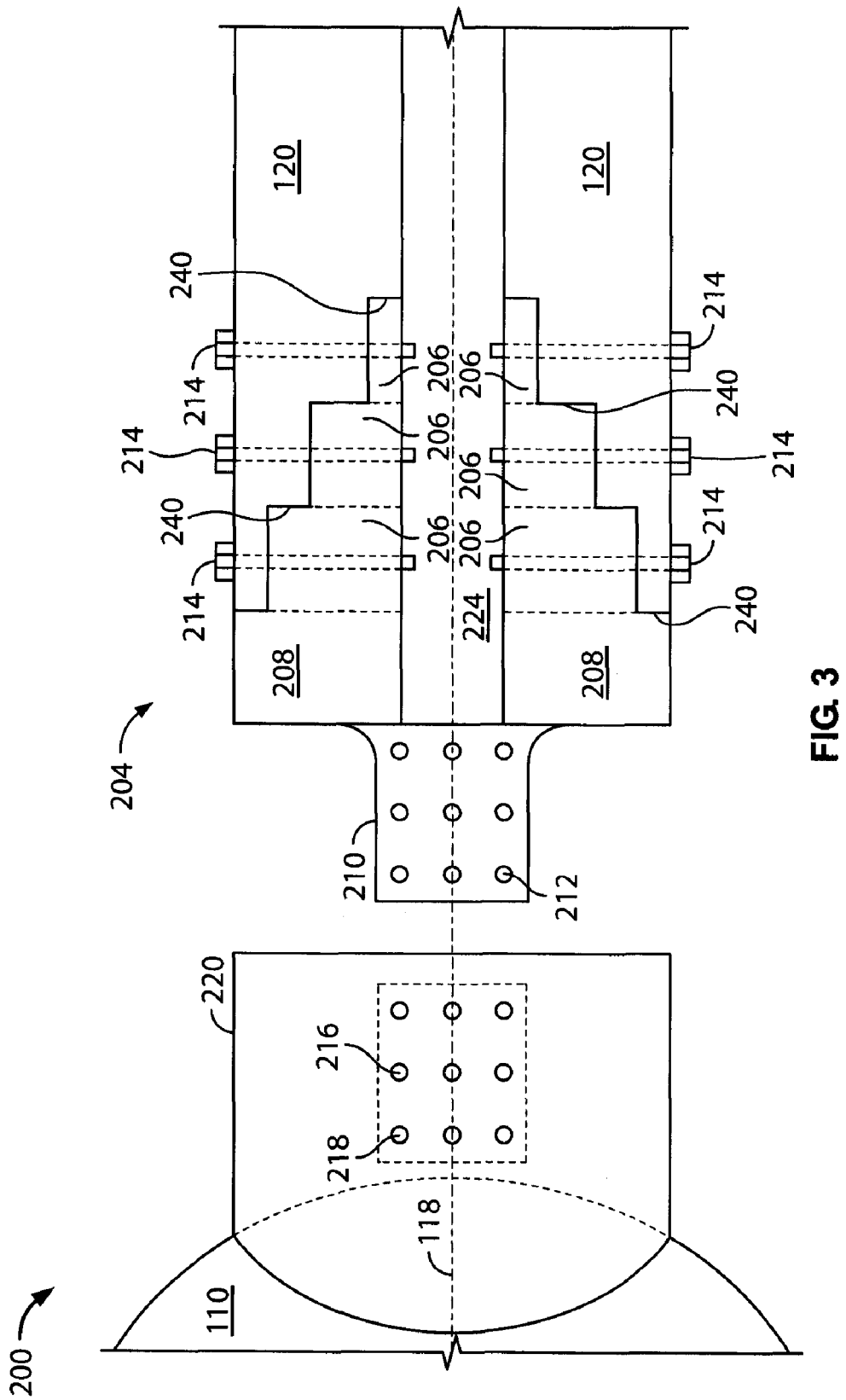
FIG. 3 is a fragmentary illustration of the exemplary blade assembly shown in FIG. 2.

FIG. 3 is a fragmentary illustration of exemplary blade assembly 200 shown in FIG. 2. Pitch axis 118 is illustrated to facilitate illustrating assembly 200 orientation with respect to system 100. Cavity 202 (shown in FIG. 2) receives fitting 204. Fasteners 214 are inserted through the skin of blade root end 120 and through the circumferential center of stepped portions 206. Inserting fasteners 214 through the circumferential center of segments 206 facilitates mitigating a potential for the creation of dead zones within portion 206 as discussed above. The use of multiple fasteners 214 through each portion 206 facilitates mitigation of load transfer in each fastener 214 as well as facilitates load path redundancy and robustness of load transfer mechanisms and processes. Blade root portion 120 may also be bonded to fitting portions 206 and 208 to facilitate coupling and load transfer from root portion 120 to fitting 204.

A blade access fitting open passage 224 is formed within fitting 204. Fasteners 214 extend into open passage 224. As discussed above, an access portal is positioned between clevis plates 210. Open passage 224 facilitates a reduction in the weight of assembly 200 and allows access to the interior of blade 112 (shown in FIG. 2) and fitting 204 for periodic inspections.

Rotatable hub 110 includes at least one clevis plate 216 that is coupled to hub 110. In an alternative embodiment, rotatable hub 110 includes a plurality of clevis plates 216 coupled to hub 110. Plates 216 have a plurality of fastener open passages 218. Fasteners (not shown in FIG. 3) are inserted through clevis plate open passages 212 and 218. A surface of fitting clevis portion 208 is mated to hub-to-fitting surface 220 as discussed further below.

Figure 4:
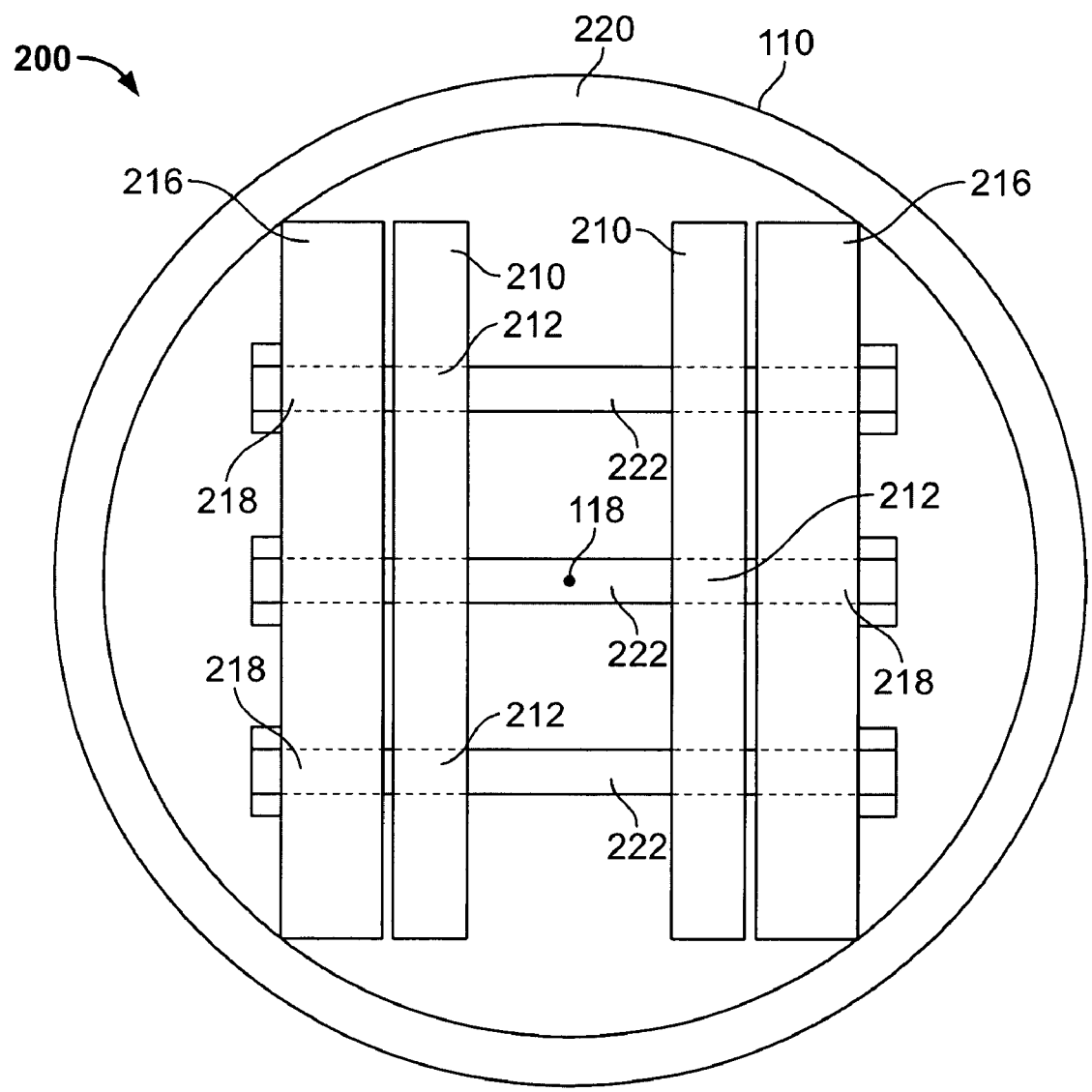
FIG. 4 is a perspective view of the exemplary blade assembly shown in FIG. 3.

FIG. 4 is a perspective view of exemplary blade assembly 200 shown in FIG. 3. Pitch axis 118 is illustrated to facilitate illustrating assembly 200 orientation with respect to system 100. Hub clevis plates 216 are coupled to hub 110. Fitting 204 (with blade root portion 120 attached) is inserted into hub 110, such that, in the exemplary embodiment, at least a portion of a root hub fitting clevis plate 210 is coupled to at least a portion of a rotatable hub clevis plate 216. Clevis plate 210 is aligned to clevis plate 216 such that a plurality of fasteners 222 may be inserted through passages 212 and 218. Fasteners 222 may be bolts with a bolt head on one end and a nut on the opposite end. Alternatively, fasteners 222 may have nuts on each end.

Clevis plates 210 and 216 cooperate with fasteners 222 to facilitate robust and efficient load transfer, including torque, axial load, and shear load transfers as well as loads induced in blades 112 associated with the aforementioned bending moments, since assembly 200 has multiple load transfer paths.

Gaskets and other sealing mechanisms known to those practiced in the art may be used to seal, for example, the mating surfaces of hub-to-fitting surface 220 and fitting clevis portion 208 (FIG. 3).

Figure 5:
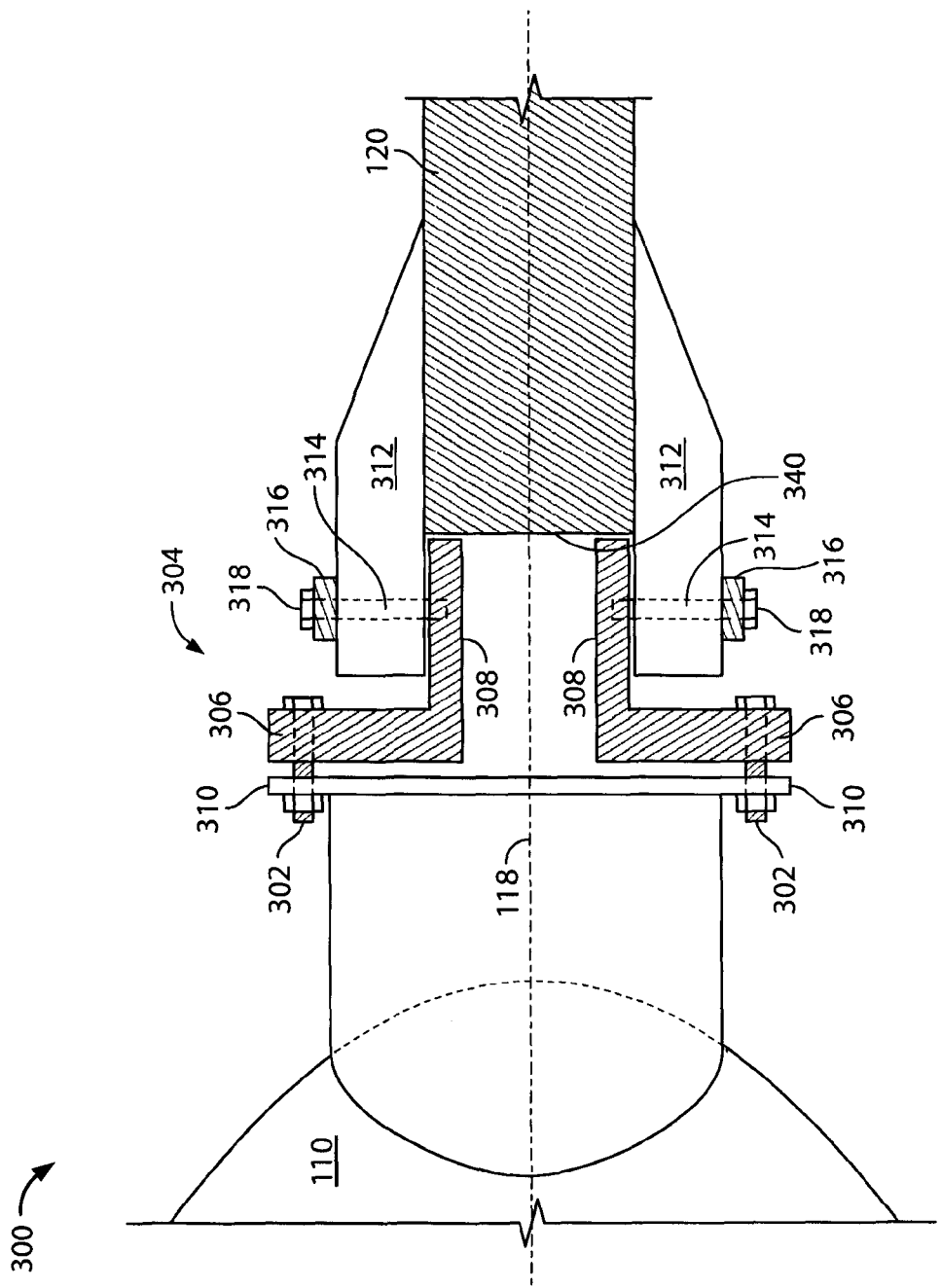
FIG. 5 is a fragmentary illustration of an alternate blade assembly that may be used with the wind turbine system in FIG. 1.

FIG. 5 is a fragmentary illustration of an alternate blade assembly 300 that may be used with wind turbine system 100 (shown in FIG. 1). The associated components are illustrated with their associated fasteners loosened and a discernable separation between the associated components to facilitate the discussion. Pitch axis 118 is illustrated to facilitate illustrating assembly 300 orientation with respect to system 100. Assembly 300 is coupled to hub 110 with a plurality of blade-to-hub attachment fasteners 302. A flanged blade root hub fitting 304 has an annular first portion 306 and an integral cylindrical second portion 308. In the alternative embodiment, hub fitting 304 is manufactured from a casting of stainless steel. Alternatively, hub fitting 304 may be manufactured of any material or combination of materials that maintain a predetermined margin to operational parameters. Also alternatively, hub fitting 304 may be manufactured as smaller components mated together using methods familiar to those practiced in the art. For example, portion 306 and portion 308 may be independently cast and then welded to each other to form fitting 304. Fasteners 302 couple portion 308 to a hub flanged surface 310. In the exemplary embodiment, portion 308 is adjacent to an end surface 340 of blade root end portion 120 where fitting 304 is coupled to surface buildup 312.

Assembly 300 has a substantially annular region of blade surface buildup 312 formed on blade root portion 120. The localized buildup facilitates using blade-to-fitting attachment fasteners 314 to couple blade root portion 120 to fitting 304 (discussed further below). Buildup 312 is formed using fiber/resin composite formation practices well known to practitioners of the art. Buildup fiber/resin lamina may be formed by depositing fibers (not shown in FIG. 5) within the resin (not shown in FIG. 5) using at least one predetermined orientation such that the localized plane of the lamina, including the aforementioned fibers, is substantially orthogonal to fasteners 314. Attachment fasteners 314 couple at least a portion 308 of flanged blade root hub fitting 304 to at least a portion 120 of the blade 112. The predetermined orientations of the fibers are based on efficient and effective transfer of loading from blade root end portion 120 to region 312 to fasteners 314 while mitigating the shear stresses on the associated region 312 interlaminar regions. The orientations of the fibers within the aforementioned plane are approximately plus and minus 45° with respect to a plane that is substantially orthogonal to pitch axis 118 and parallel to an axis of fastener 314. Alternatively, fiber orientations may be adjusted to any arrangement that mitigates the shear stresses of the interlaminar regions within region 312.

Gaskets and other sealing mechanisms known in the art may be used to seal, for example, the mating surfaces of hub flanged surface 310 and fitting annular portion 306.

Substantially arcuate segmented bearing plates 316 are positioned between fastener heads 318 and buildup region 312 to mitigate fastener head 318 pull-through by facilitating an equalized transfer of localized loads within fasteners 314 along the outer circumference of region 312 in contact with bearing plate 316.

Figure 6:
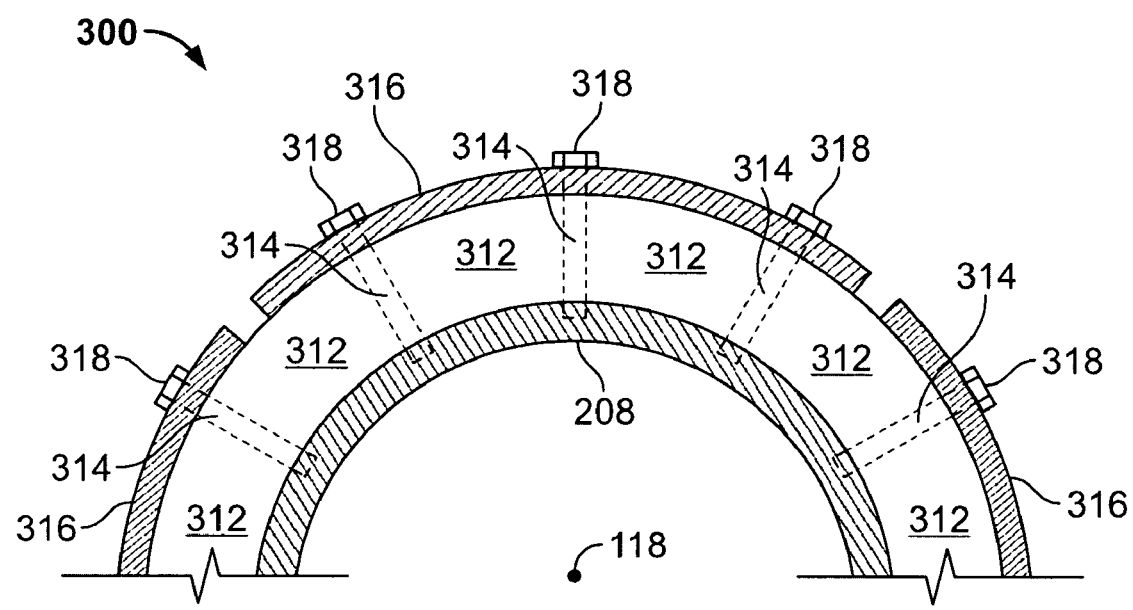
FIG. 6 is a perspective view of the alternate blade assembly shown in FIG. 2.

FIG. 6 is a perspective view of blade assembly 300. Pitch axis 118 is illustrated to facilitate illustrating assembly 300 orientation with respect to system 100. Segmented bearing plates 316 are positioned on the circumference of buildup region 312. Plates 316 are substantially arcuate segments that are formed in 90° arcs. In the exemplary embodiment, at least a portion of at least one arcuate plate 316 is coupled to at least a portion of blade root portion 120 with a plurality of fasteners. Alternatively, plates 316 may be formed in any arc lengths that facilitate equalized transfer of localized loads as discussed above. The use of multiple fasteners 314 in each plate 316 facilitates mitigation of load transfer in each fastener 314 as well as facilitates load path redundancy and robustness of load transfer mechanisms and processes. Fasteners 314 fully penetrate plates 316, buildup region 312 and partially penetrate at least a portion of flanged blade root hub fitting cylindrical portion 308. Alternatively, fastener 314 may be extended to fully penetrate portion 308 and a device similar to a bolt nut (not shown in FIG. 6) may be used to tighten fastener 314 to assembly 300.

Improved structural efficiency may facilitate reduced blade weight and material usage. Improved structural efficiency may be defined as an extension of the number of fatigue cycles a component may accumulate prior to attaining an interlaminar shear limit, or as a decrease in the amplitude of and/or frequency of cyclic stresses. For example, a more robust, damage tolerant (i.e., an increased ability to retain load-carrying capabilities after exposure to sudden load increases) assembly for joining the blade to a hub will provide an increase in the load transfer capabilities of the blade assemblies. This may facilitate a decrease in the number of laminations on the blades with a subsequent decrease in the weight of the blades. As the weight of the blades decreases, a lower tower weight at the top of the tower will be facilitated and the design structural support strength for the tower and the associated materials may be reduced.

The methods and apparatus for a wind turbine blade described herein facilitate operation of a wind turbine system. More specifically, the wind turbine blade assembly as described above facilitates an efficient load transfer scheme along with a decrease in weight at the top of a wind turbine tower. Also, the robust, wear-resistant assembly facilitates blade reliability. Such assembly also facilitates reliability, and reduced maintenance costs and wind turbine system outages.

Exemplary embodiments of wind turbine blade assemblies as associated with wind turbine systems are described above in detail. The methods, apparatus and systems are not limited to the specific embodiments described herein nor to the specific illustrated wind turbine blade assemblies.

While the invention has been described in terms of various specific embodiments, those skilled in the art will recognize that the invention can be practiced with modification within the spirit and scope of the claims.

What is claimed is:

1. A method of assembling a wind turbine system comprising:
   providing a blade root hub fitting defining a fitting open passage that includes a plurality of fastener open passages in flow communication with the fitting open passage;
   providing a wind turbine blade including a fitting cavity defined therein;
   inserting the blade root hub fitting into the fitting cavity such that the blade root hub fitting is positioned within the wind turbine blade;
   coupling the wind turbine blade to the blade root hub fitting using a plurality of fasteners that each extend through a respective one of the plurality of fastener open passages and into the fitting open passage, wherein the fitting open passage remains substantially unobstructed, wherein the blade root hub fitting is a stepped joint blade root hub fitting that contacts an inner surface of a wind turbine blade root end portion and an end surface of the wind turbine blade root end portion, when the wind turbine blade is coupled to the blade root hub fitting, such that a blade coupling portion does not extend over a radially outer surface of the wind turbine blade; and
   coupling the blade root hub fitting to a rotatable hub.

2. A method in accordance with claim 1 further comprising coupling at least a portion of the flanged blade root hub fitting to at least a portion of a rotatable hub flanged surface.

3. A method in accordance with claim 1 wherein coupling the wind turbine blade to the blade root hub fitting comprises coupling the stepped joint blade root hub fitting to the blade with the fasteners, wherein the stepped joint blade root hub fitting includes:
   a substantially cylindrical clevis plate portion, that includes at least one clevis plate and a first diameter; and
   a plurality of stepped portions, that include at least a first portion and a second portion wherein the first portion has a first portion diameter and the second portion has a second portion diameter, the clevis plate portion first diameter being larger than the first portion diameter and the first portion diameter being larger than the second portion diameter.

4. A method in accordance with claim 3 wherein coupling the blade root hub fitting to a rotatable hub comprises coupling at least a portion of the stepped joint blade root hub fitting clevis plate to at least a portion of a rotatable hub clevis plate.

5. A wind turbine blade assembly comprising:
   at least one wind turbine blade comprising a blade root portion, said blade root portion comprising a fitting cavity defined therein by an end surface of said blade root portion and a blade surface buildup;
   at least one blade root hub fitting, said fitting cavity sized to receive said blade root hub fitting therein, said blade root hub fitting comprising a blade coupling portion that contacts said blade along said portion of said end surface defining said fitting cavity, wherein said blade coupling portion does not extend over a radially outer surface of said wind turbine blade;
   a rotatable hub;
   a first plurality of fasteners used to couple said blade root hub fitting to said rotatable hub; and
   a second plurality of fasteners used to couple said blade root hub fitting to said blade root portion.

6. A wind turbine blade assembly in accordance with claim 5 wherein said blade root portion comprises a plurality of fibers bonded within a resin, said fibers deposited with at least one predetermined orientation.

7. A wind turbine blade assembly in accordance with claim 5 wherein said blade root hub fitting comprises a flanged blade root hub fitting, said flanged fitting comprising:
   a substantially annular first portion, said first portion comprising a wall, said wall forming a substantially circular open passage having a first diameter;
   a substantially cylindrical second portion integral to said first portion, said second portion being substantially orthogonal to said first portion, said second portion comprising a substantially cylindrical wall, said cylindrical wall having a second diameter, said second diameter being substantially similar to said first diameter.

8. A wind turbine blade assembly in accordance with claim 7 wherein said flanged blade root hub fitting further comprises at least one substantially arcuate plate, said plate configured to be coupled to at least a portion of said blade root portion.

* * * * *